United States Patent
Ishibashi et al.

(10) Patent No.: US 10,753,497 B2
(45) Date of Patent: Aug. 25, 2020

(54) SHUTOFF-OPENING DEVICE

(71) Applicant: FUJIKIN INCORPORATED, Osaka-shi (JP)

(72) Inventors: Keisuke Ishibashi, Osaka (JP); Tsuyoshi Tanikawa, Osaka (JP); Michio Yamaji, Osaka (JP); Takashi Funakoshi, Osaka (JP); Hidenori Kiso, Osaka (JP); Tsuneyuki Okabe, Tokyo (JP); Hiroaki Kikuchi, Oshu (JP); Kuniyasu Sakashita, Nirasaki (JP)

(73) Assignee: FUJIKIN INCORPORATED, Osaka (JP)

( * ) Notice: Subject to any disclaimer, the term of this patent is extended or adjusted under 35 U.S.C. 154(b) by 0 days.

(21) Appl. No.: 15/566,016

(22) PCT Filed: Apr. 5, 2016

(86) PCT No.: PCT/JP2016/061089
§ 371 (c)(1),
(2) Date: Oct. 12, 2017

(87) PCT Pub. No.: WO2016/167154
PCT Pub. Date: Oct. 20, 2016

(65) Prior Publication Data
US 2018/0112788 A1    Apr. 26, 2018

(30) Foreign Application Priority Data
Apr. 15, 2015    (JP) .................................. 2015-082998

(51) Int. Cl.
*F16K 27/02* (2006.01)
*F16K 11/22* (2006.01)
(Continued)

(52) U.S. Cl.
CPC .......... *F16K 27/0236* (2013.01); *F16K 1/301* (2013.01); *F16K 7/00* (2013.01);
(Continued)

(58) Field of Classification Search
CPC ............. Y10T 137/87885; F16K 11/20; F16K 11/207; F16K 11/22; F16K 11/24;
(Continued)

(56) References Cited

U.S. PATENT DOCUMENTS

| | | | | |
|---|---|---|---|---|
| 4,356,840 A | * | 11/1982 | Friedland | ............ F15B 11/0426 137/487.5 |
| 5,605,179 A | * | 2/1997 | Strong, Jr. | ............ F16K 27/003 137/240 |

(Continued)

FOREIGN PATENT DOCUMENTS

| | | |
|---|---|---|
| EP | 1873433 A1 | 1/2008 |
| JP | 2001-242940 A | 9/2001 |

(Continued)

OTHER PUBLICATIONS

International Search Report dated Jul. 5, 2016, issued for PCT/JP2016/061089.
(Continued)

*Primary Examiner* — Haily K. Do
(74) *Attorney, Agent, or Firm* — Locke Lord LLP

(57) ABSTRACT

A first on-off valve (2) and a second on-off valve (3) each are a two-port valve. A first passage block (5) is provided with a first on-off valve-corresponding inflow passage (11) and a first on-off valve-corresponding outflow passage (12). A second passage block (6) is provided with a second on-off valve-corresponding inflow passage (14) and a second on-off valve-corresponding outflow passage (15). The second on-off valve-corresponding outflow passage (15) is in communication with an upstream side portion of the first on-off (Continued)

valve-corresponding outflow passage (12) via a communicating passage (13) formed in the first passage block (5). An orifice (20) is provided between the second on-off valve-corresponding outflow passage (15) and the communicating passage (13).

2 Claims, 4 Drawing Sheets

(51) Int. Cl.
    *F16K 47/10* (2006.01)
    *F16K 11/20* (2006.01)
    *F16K 7/00* (2006.01)
    *F16K 27/00* (2006.01)
    *F16K 1/30* (2006.01)

(52) U.S. Cl.
    CPC .............. *F16K 11/20* (2013.01); *F16K 11/22* (2013.01); *F16K 27/003* (2013.01); *F16K 47/10* (2013.01); *F15B 2215/30* (2013.01); *Y10T 137/87885* (2015.04)

(58) Field of Classification Search
    CPC ..... F16K 7/14; F16K 7/16; F16K 7/17; F16K 7/12; F16K 27/0236; F16K 27/0263; F16K 27/029; F16K 27/003; F16K 47/10; F16K 47/08; F16K 47/14; G05D 7/0635; G05D 7/0641; G05D 7/0647; G05D 7/0652; G05D 7/0658; F15B 13/0814; F15B 13/0817; G01F 1/42; G01F 15/005
    See application file for complete search history.

(56) References Cited

U.S. PATENT DOCUMENTS

| | | | | |
|---|---|---|---|---|
| 6,035,893 | A * | 3/2000 | Ohmi .................. | F15B 13/0814 137/597 |
| 6,152,175 | A * | 11/2000 | Itoh ....................... | F16K 27/003 137/602 |
| 6,209,571 | B1 * | 4/2001 | Itoh ....................... | F16K 27/003 137/240 |
| 8,707,992 | B2 * | 4/2014 | Igarashi ................ | F16K 27/003 137/597 |
| 9,556,966 | B2 * | 1/2017 | Hirose ................... | F16K 27/003 |
| 9,841,770 | B2 * | 12/2017 | Hirata ................... | G05D 7/0641 |
| 2002/0092564 | A1 * | 7/2002 | Ollivier ................ | G05D 7/0647 137/487.5 |
| 2003/0061888 | A1 | 4/2003 | Gould et al. | |
| 2003/0180458 | A1 * | 9/2003 | Sneh .................... | C23C 16/4412 427/248.1 |
| 2005/0072481 | A1 * | 4/2005 | Hanada ................. | F16K 27/003 137/884 |
| 2007/0205384 | A1 * | 9/2007 | Kurosawa ............. | F15B 13/081 251/127 |
| 2011/0315905 | A1 * | 12/2011 | Hirose ................... | F15D 1/025 251/12 |
| 2013/0001453 | A1 | 1/2013 | Hirose et al. | |
| 2013/0333768 | A1 * | 12/2013 | Chandrasekharan ........................ | C23C 16/45544 137/238 |
| 2015/0075660 | A1 * | 3/2015 | Inada .................... | F16K 27/003 137/884 |
| 2015/0362105 | A1 | 12/2015 | Nagase et al. | |
| 2016/0252913 | A1 * | 9/2016 | Hirata ................. | G05D 7/0635 137/486 |
| 2016/0282880 | A1 * | 9/2016 | Nagase ................ | G05D 7/0635 |

FOREIGN PATENT DOCUMENTS

| | | |
|---|---|---|
| JP | 2001-254857 A | 9/2001 |
| JP | 2013-231460 A | 11/2013 |
| KR | 10-2008-0002914 A | 1/2008 |
| TW | 201140270 A | 11/2011 |
| WO | 2014/119265 A1 | 8/2014 |
| WO | WO-2014156042 A1 * | 10/2014 ........... G01F 15/005 |

OTHER PUBLICATIONS

Official Letter dated Jan. 31, 2019, issued for the corresponding TW patent application No. 105111581 and English machine translation thereof.

Office Action dated Janaury 7, 2019, issued for the corresponding KR patent application No. 10-2017-7032104 and English translation thereof.

* cited by examiner

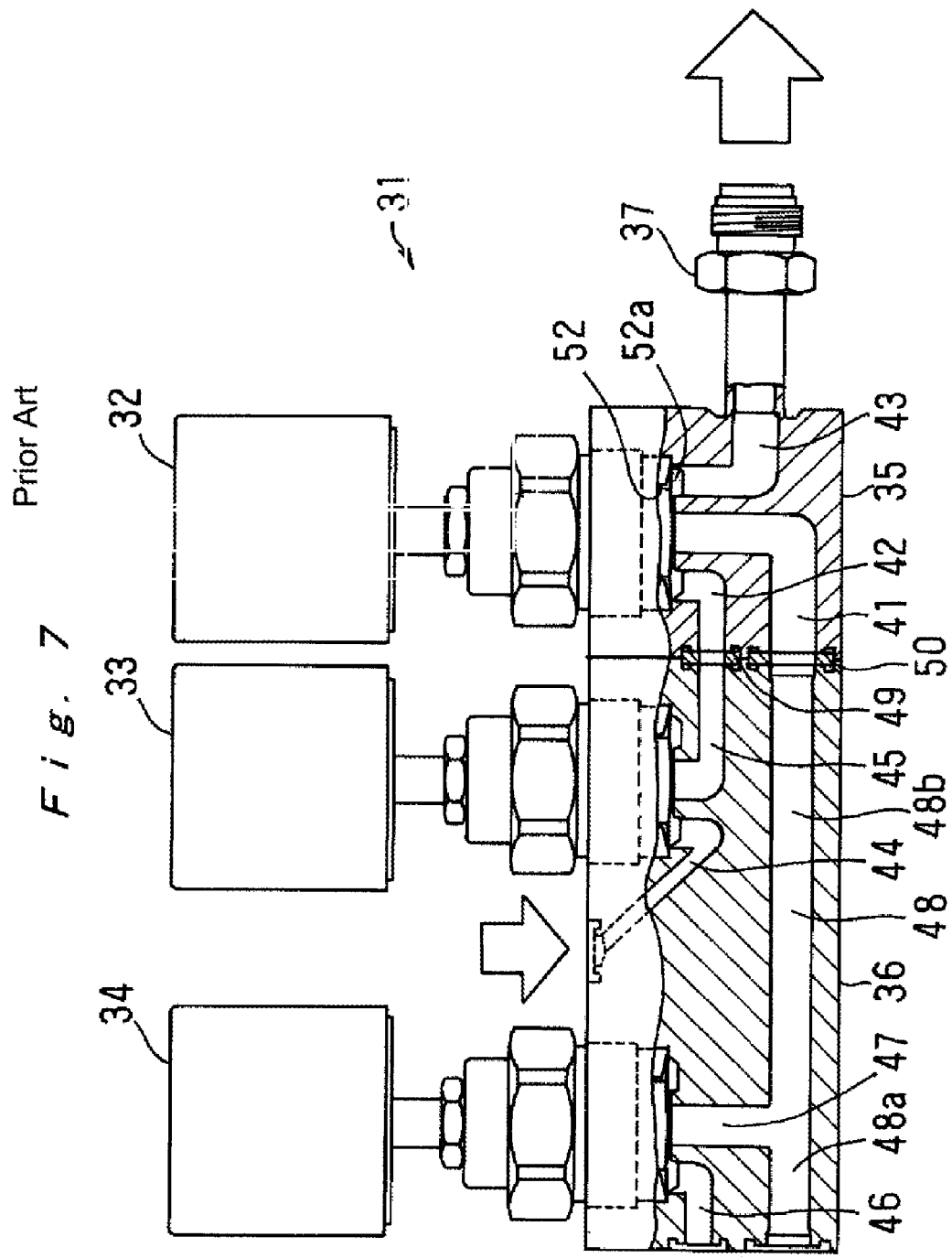

SHUTOFF-OPENING DEVICE

TECHNICAL FIELD

The present invention relates to shutoff-opening devices, and more particularly to a shutoff-opening device that is suitable to be used in a gas supply section of semiconductor manufacturing equipment.

BACKGROUND ART

In the gas supply section of semiconductor manufacturing equipment, a shutoff-opening device is used, and such a shutoff-opening device is obtained by assembling a plurality of on-off valves and one or more passage blocks (Patent Literature 1). FIG. 7 shows an example of the shutoff-opening device.

In FIG. 7, a shutoff-opening device 31 includes: a first on-off valve 32 disposed on a downstream side; a second on-off valve 33 adjacent to an upstream side of the first on-off valve 32; a third on-off valve 34 adjacent to an upstream side of the second on-off valve 33; a first passage block 35 having the shape of a rectangular parallelepiped and supporting the first on-off valve 32; a second passage block 36 having the shape of a rectangular parallelepiped and supporting the second on-off valve 33 and the third on-off valve 34; and a joint 37 provided on an end surface of a downstream side of the first passage block 35 and to be connected to an external device.

The first on-off valve 32 is a three-port diaphragm valve, the second on-off valve 33 is a two-port diaphragm valve, and the third on-off valve 34 is a two-port diaphragm valve.

The first passage block 35 corresponding to the first on-off valve 32 is provided with: a first on-off valve-corresponding first inflow passage 41; a first on-off valve-corresponding second inflow passage 42; and a first on-off valve-corresponding outflow passage 43.

The second passage block 36 corresponding to the second on-off valve 33 and the third on-off valve 34 is provided with: a second on-off valve-corresponding inflow passage 44; a second on-off valve-corresponding outflow passage 45; a third on-off valve-corresponding inflow passage 46; a third on-off valve-corresponding outflow passage 47; and a first on-off valve-corresponding communicating passage 48.

The second on-off valve-corresponding outflow passage 45 is in communication with the first on-off valve-corresponding second inflow passage 42 at a butt surface of the first passage block 35 and the second passage block 36 via a seal portion 49.

The first on-off valve-corresponding communicating passage 48 consists of: a first portion 48a having one end that is open to a rear surface thereof and having the other end that is in communication with a lower end portion of the third on-off valve-corresponding outflow passage 47; and a second portion 48b that is contiguous with the first portion 48a and extends forward. The second portion 48b is in communication with the first on-off valve-corresponding first inflow passage 41 at a butt surface of the first passage block 35 and the second passage block 36 via a seal portion 50.

The first on-off valve-corresponding second inflow passage 42 and the first on-off valve-corresponding outflow passage 43 that are passages leading to the first on-off valve 32, which is a three-port diaphragm valve, are normally in communication with each other via an annular groove 52a of a valve chamber 52.

In a state where the first on-off valve 32 is closed and the second on-off valve 33 is open, when a fluid is caused to flow into the second on-off valve-corresponding inflow passage 44 as shown by arrows in FIG. 7, the fluid flows through the second on-off valve-corresponding outflow passage 45 to the first on-off valve-corresponding second inflow passage 42 and then flows through the first on-off valve-corresponding outflow passage 43 to be supplied to the external device side.

CITATION LIST

Patent Literature

Patent Literature 1: Japanese Unexamined Patent Application Publication JP-A-2001-254857

SUMMARY OF INVENTION

Technical Problem

The above-described shutoff-opening device 31 is installed in the close vicinity of a processing furnace of a semiconductor processing apparatus in some cases. In such a case, because the first on-off valve-corresponding second inflow passage 42 and the first on-off valve-corresponding outflow passage 43 that are the passages leading to the first on-off valve 32 are normally in communication with each other, when the pressure on the processing furnace side is high, the fluid inside the processing furnace, in some cases, flows backward to the first on-off valve-corresponding outflow passage 43, the first on-off valve-corresponding second inflow passage 42, and the second on-off valve-corresponding outflow passage 45. In the case where the fluid that has been inside the processing furnace enters the shutoff-opening device 31, there arises a problem that the frequency of replacement of the valve is increased because of contamination inside the valve, thus corrosion, and occurrence of particles.

An object of the present invention is to provide a shutoff-opening device capable of preventing inside contamination due to the backward flow of a fluid and thus capable of decreasing the frequency of replacement of a valve.

Solution to Problem

The shutoff-opening device in accordance with the present invention is a shutoff-opening device including: a first on-off valve disposed on a downstream side; a second on-off valve adjacent to an upstream side of the first on-off valve; and a passage block supporting the first on-off valve and the second on-off valve, wherein each of the first on-off valve and the second on-off valve is a two-port valve, and the passage block is provided with a first on-off valve-corresponding inflow passage, a first on-off valve-corresponding outflow passage, a second on-off valve-corresponding inflow passage, and a second on-off valve-corresponding outflow passage, and the second on-off valve-corresponding outflow passage is in communication with the first on-off valve-corresponding outflow passage via a communicating passage formed in the passage block, and a throttling portion is provided between the second on-off valve-corresponding outflow passage and the communicating passage.

The two-port on-off valve is generally a diaphragm valve in which a diaphragm is pressed against or separated from a valve seat to close or open a fluid passage. It is preferable that the diaphragm valve is provided on a bottom surface of a valve chamber thereof with an annular groove, and that the annular groove is provided at one location thereof with an inlet port communicating with an opening of an inflow passage.

In a state where the first on-off valve is closed and the second on-off valve is open, a fluid that has flowed into the second on-off valve-corresponding inflow passage flows through the second on-off valve-corresponding outflow passage, the communicating passage, and the first on-off valve-corresponding outflow passage, to be supplied to the external device (processing furnace of the semiconductor processing apparatus, etc.).

In this case, because the first on-off valve is closed, the fluid does not enter the valve chamber of the first on-off valve from the first on-off valve-corresponding outflow passage. In addition, a portion in which the throttling portion is provided has a reduced diameter of the fluid passage. This allows the fluid to be sent from the second on-off valve-corresponding outflow passage to the communicating passage and the first on-off valve-corresponding outflow passage in a state where the pressure on a primary side (second on-off valve-corresponding outflow passage) is higher than the pressure on the secondary side (communicating passage). Therefore, even if the pressure of the fluid on the external device side is increased to some degree, the fluid is prevented from flowing backward from the communicating passage to the second on-off valve-corresponding outflow passage, whereby the fluid does not enter the valve chamber of the second on-off valve. This prevents back diffusion of the fluid due to the fluid flowing backward from the external device side, prevents corrosion of the diaphragm due to the fluid flowing backward, and reduces the frequency of replacement of the on-off valve, in both of the first on-off valve and the second on-off valve.

The shape and configuration of the throttling portion is not particularly limited. For example, a nozzle or an orifice may be used as the throttling portion. The orifice may be an orifice gasket in which the diameter of a hole of the gasket is smaller than the diameter of a hole of a conventional gasket having the hole diameter equal to the passage diameter. The orifice gasket may be formed separately from a gasket for forming a seal portion, and may be used together with the gasket.

The passage block, for example, consists of a first passage block supporting the first on-off valve, and a second passage block supporting the second on-off valve. A butt portion of the passages is provided with a seal portion using the gasket, as required.

The shutoff-opening device further includes: a third on-off valve adjacent to an upstream side of the second on-off valve and supported by the passage block, wherein the third on-off valve is a two-port valve, the passage block is provided with a third on-off valve-corresponding inflow passage, a third on-off valve-corresponding outflow passage, and a first on-off valve-corresponding communicating passage, and the first on-off valve-corresponding communicating passage has one end that is open to an outer surface of the passage block, an intermediate portion that is in communication with the third on-off valve-corresponding outflow passage, and the other end that is in communication with the first on-off valve-corresponding inflow passage, in some cases.

The third on-off valve may be supported by the third passage block. However, it is preferable that the third on-off valve is supported by the second passage block supporting the second on-off valve.

By additionally providing the third on-off valve and the corresponding passages, a vacuum pump is connected to the third on-off valve in addition to a fluid supply line for supplying the fluid to the first on-off valve, whereby a vacuum vent line may be formed.

Advantageous Effects of Invention

In the shutoff-opening device in accordance with the present invention, in a state where the first on-off valve is closed and the second on-off valve is open, when a fluid is caused to flow into the second on-off valve-corresponding inflow passage, because the first on-off valve is closed, the fluid does not enter the valve chamber of the first on-off valve from the first on-off valve-corresponding outflow passage. In addition, a portion in which the throttling portion is provided has a reduced diameter of the fluid passage, and the fluid is sent from the second on-off valve-corresponding outflow passage to the communicating passage and the first on-off valve-corresponding outflow passage in a state where the pressure on the primary side (second on-off valve-corresponding outflow passage) is higher than the pressure on the secondary side (communicating passage). Because of this configuration, the fluid is prevented from flowing backward from the communicating passage to the second on-off valve-corresponding outflow passage, whereby the fluid does not enter the valve chamber of the second on-off valve. This allows prevention of internal contamination due to the fluid flowing backward from the external device side, and reduction of the frequency of replacement of the valve, in both of the first on-off valve and the second on-off valve.

BRIEF DESCRIPTION OF DRAWINGS

FIG. 7 is a side view showing one example of a conventional shutoff-opening device, with a part of which being partially cut out.

REFERENCE SIGNS LIST

1: shutoff-opening device, 2: first on-off valve, 3: second on-off valve, 4: third on-off valve, 5: first passage block, 6: second passage block, 11: first on-off valve-corresponding inflow passage, 12: first on-off valve-corresponding outflow passage, 13: communicating passage, 14: second on-off valve-corresponding inflow passage, 15: second on-off valve-corresponding outflow passage, 16: third on-off valve-corresponding inflow passage, 17: third on-off valve-corresponding outflow passage, 18: first on-off valve-corresponding communicating passage, 20: orifice (throttling portion)

DESCRIPTION OF EMBODIMENTS

Figure 1:
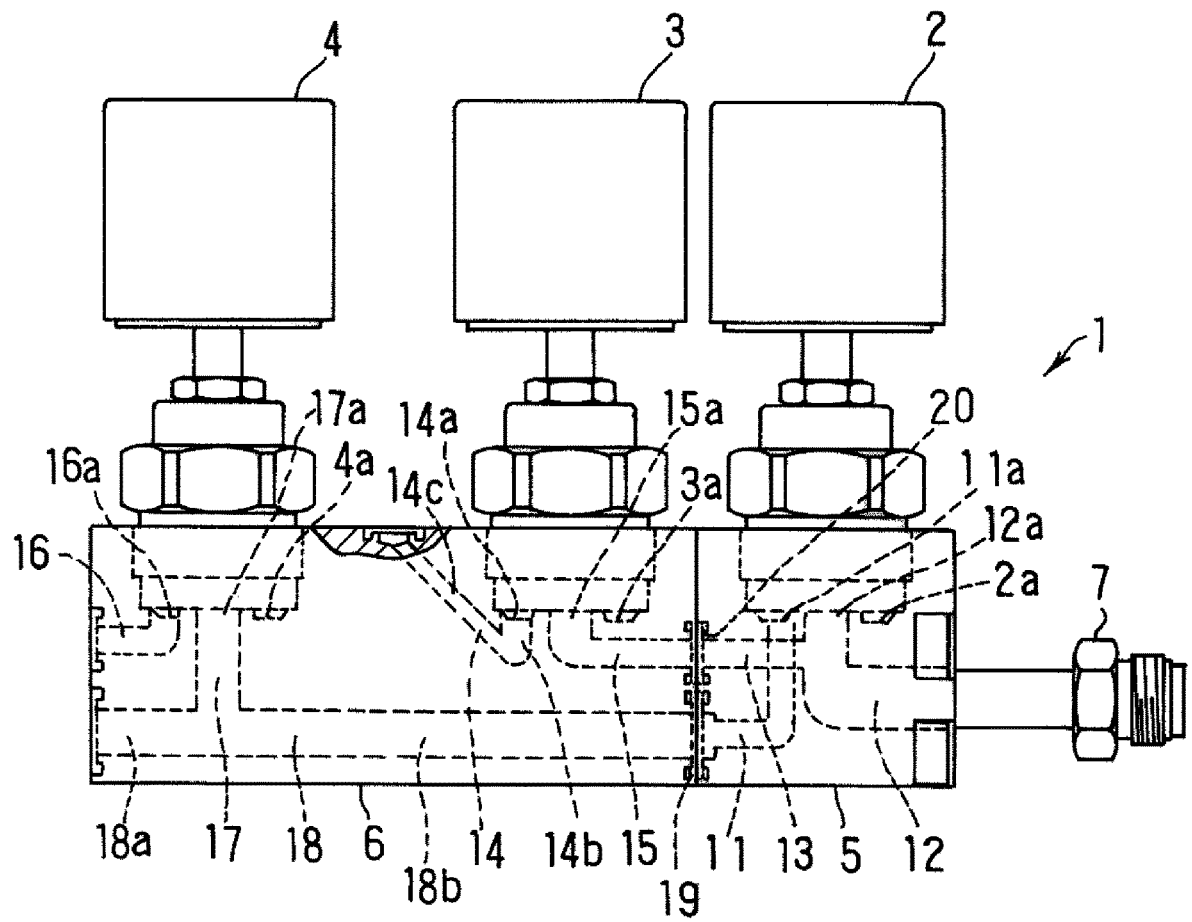
FIG. 1 is a side view of a shutoff-opening device in accordance with one embodiment of the present invention.
Figure 2:
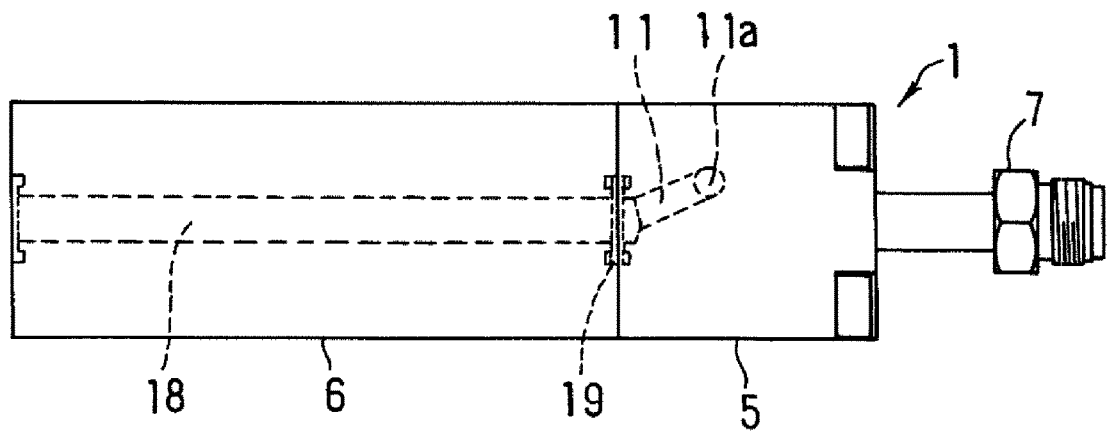
FIG. 2 is a bottom view of the shutoff-opening device shown in FIG. 1.
Figure 3:
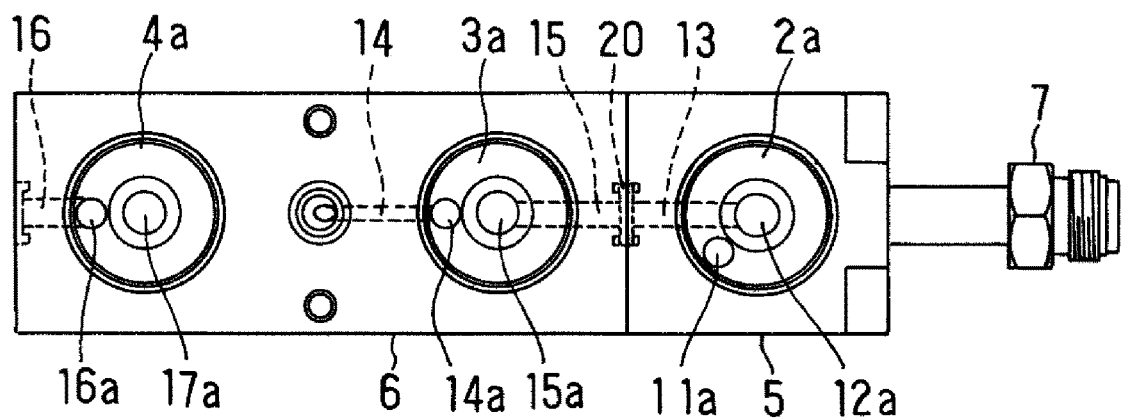
FIG. 3 is a plan view of a major part (in the state of on-off valves being removed) of FIG. 1.

Embodiments of the present invention will be described below with reference to the drawings. In the following description, the upper and lower sides of FIG. 1 are referred to as "upper" and "lower", respectively. Likewise, the right and left sides of FIG. 1 are referred to as "front" and "rear", respectively. In addition, the right and left sides when seen from the "rear" side toward the "front" side as described above are referred to as "right" and "left", respectively.

A shutoff-opening device 1 is, for example, disposed in the close vicinity of a processing furnace (not shown) of a semiconductor processing apparatus, and includes: a first on-off valve 2 disposed on a front side (downstream side); a second on-off valve 3 adjacent to a rear side (upstream side) of the first on-off valve 2; a third on-off valve 4 adjacent to a rear side (upstream side) of the second on-off valve 3; a first passage block 5 having the shape of a rectangular parallelepiped and supporting the first on-off valve 2; a second passage block 6 having the shape of a rectangular parallelepiped and supporting the second on-off valve 3 and the third on-off valve 4; and a joint 7 provided on a front surface (end surface of the downstream side) of the first passage block 5 and to be connected to a processing furnace (external device).

The first on-off valve 2, the second on-off valve 3, and the third on-off valve 4 are two-port diaphragm valves, and are attached on upper surfaces of the corresponding passage blocks 5 and 6. The diaphragm valve, although not shown, includes: a body (in this shutoff-opening device 1, the passage blocks 5 and 6 are bodies for the on-off valves 2, 3, and 4) provided with a fluid passage; a diaphragm that is pressed against or is separated from an annular valve seat provided on a peripheral edge of the fluid passage to close or open the fluid passage; a vertically movable valve rod provided at a lower end thereof with a diaphragm presser; and the like.

The first passage block 5 includes: a substantially L-shaped first on-off valve-corresponding inflow passage 11 having one end that is in communication with one location (inlet port) 11*a* of an annular groove 2*a* provided on a bottom surface of a valve chamber of the first on-off valve 2, and having the other end that is open to a rear surface of the first passage block 5; and a substantially L-shaped first on-off valve-corresponding outflow passage 12 having one end that is in communication with an outlet port 12*a* at a middle of a valve chamber of the first on-off valve 2, and having the other end that is open to a front surface of the first passage block 5.

The second passage block 6 includes: a second on-off valve-corresponding inflow passage 14; a substantially L-shaped second on-off valve-corresponding outflow passage 15; a substantially L-shaped third on-off valve-corresponding inflow passage 16; a third on-off valve-corresponding outflow passage 17; and a first on-off valve-corresponding communicating passage 18. The second on-off valve-corresponding inflow passage 14 consists of: at one end thereof, a relatively short vertical portion 14*b* that is in communication with one location (inlet port) 14*a* of an annular groove 3*a* provided on a bottom surface of a valve chamber of the second on-off valve 3; and, at the other end thereof, a relatively long inclination portion 14*c* that is open to an upper surface of the second passage block 6 between the second on-off valve 3 and the third on-off valve 4. The second on-off valve-corresponding outflow passage 15 has: one end that is in communication with an outlet port 15*a* at a middle of a valve chamber of the second on-off valve 3; and the other end that is open to a front surface of the second passage block 6. The third on-off valve-corresponding inflow passage 16 has: one end that is in communication with one location (inlet port) 16*a* of an annular groove 4*a* provided on a bottom surface of a valve chamber of the third on-off valve 4; and the other end that is open to a rear surface of the second passage block 6. The third on-off valve-corresponding outflow passage 17 has: one end that is in communication with an outlet port 17*a* at a middle of a valve chamber of the third on-off valve 4; and the other end that is in the vicinity of a lower surface of the second passage block 6. The first on-off valve-corresponding communicating passage 18 has: one end that is open to a rear surface of the second passage block 6; the other end that is open to a front surface of the second passage block 6; and an intermediate portion that is in communication with a lower end of the third on-off valve-corresponding outflow passage 17.

Excluding the inlet port 11*a* of the first on-off valve 2, the inlet ports 14*a* and 16*a* and the outlet ports 12*a*, 15*a*, and 17*a* are provided so as to be arranged in one row (in the front-rear direction) in the direction parallel to a center line of the shutoff-opening device 1. The inlet port 11*a* of the first on-off valve 2 is disposed so as to be shifted to the right side from the other ports 14*a*, 16*a*, 12*a*, 15*a*, and 17*a*.

A nitrogen gas purge line is connected to an opening of an upper surface of the second on-off valve-corresponding inflow passage 14. A process gas supply line is connected to an opening of a rear surface of the first on-off valve-corresponding communicating passage 18. A vacuum vent line is connected to an opening of a rear surface of the third on-off valve-corresponding inflow passage 16.

The first passage block 5 is further provided with a communicating passage 13 extending in the front-rear direction and causing an opening of the front side of the second on-off valve-corresponding outflow passage 15 to be in communication with an upstream-side portion of the first on-off valve-corresponding outflow passage 12.

The first on-off valve-corresponding communicating passage 18 consists of: a first portion 18*a* that extends rearward from a portion being in communication with the lower end of the third on-off valve-corresponding outflow passage 17 and is open to the rear surface (outer surface) of the second passage block 6; and a second portion 18*b* that extends forward from the portion being in communication with the lower end of the third on-off valve-corresponding outflow passage 17, is open to the front surface of the second passage block 6, and is in communication with the first on-off valve-corresponding inflow passage 11.

Figure 4:
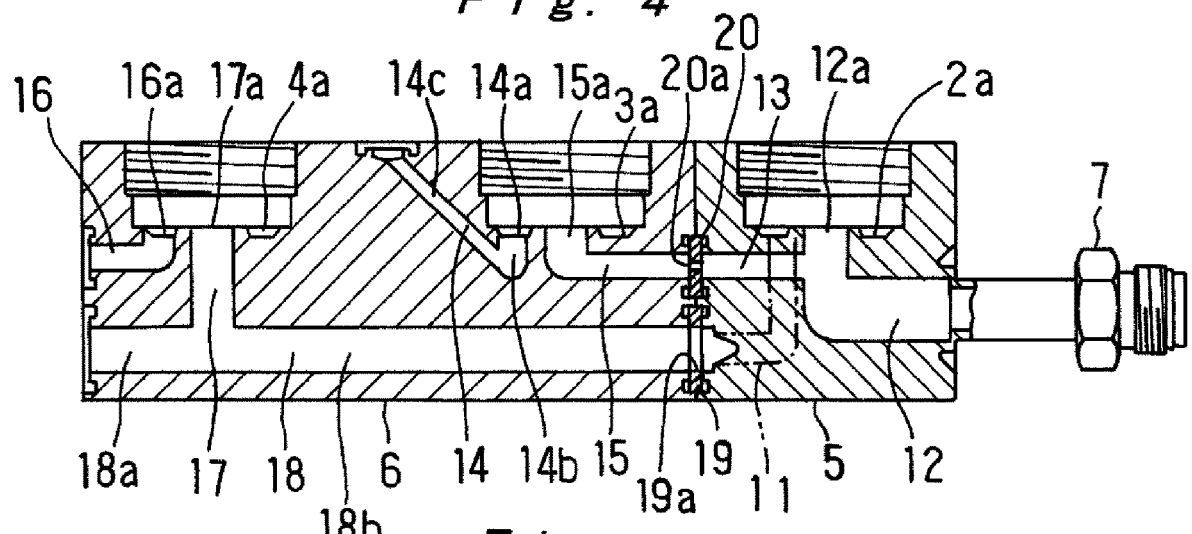
FIG. 4 is a vertical sectional view of the major part shown in FIG. 3.
Figure 5:
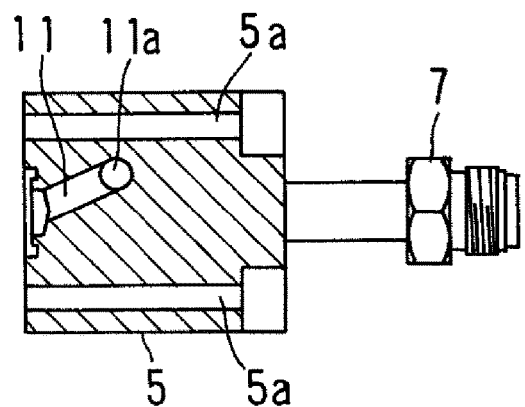
FIG. 5 is a horizontal sectional view showing a first on-off valve-corresponding inflow passage of a first passage block.

The second portion 18*b* is in communication with the first on-off valve-corresponding inflow passage 11 via a seal portion 19 at a butt surface of the first passage block 5 and the second passage block 6. To form the seal portion 19, as shown in FIG. 4, a gasket is used as the major component, in which the diameter of a through hole 19*a* is equal to the diameter of the second portion 18*b* of the first on-off valve-corresponding communicating passage 18 and the diameter of the first on-off valve-corresponding inflow passage 11.

Between the second on-off valve-corresponding outflow passage 15 and the communicating passage 13, an orifice 20 that is provided at the butt surface of the first passage block 5 and the second passage block 6 is disposed. To form the orifice 20, an orifice gasket is used as the major component, in which the diameter of a through hole 20*a* is extremely smaller than the diameter of the second on-off valve-corresponding outflow passage 15 and the diameter of the communicating passage 13. The orifice 20 forms a throttling portion, whereby the pressure is high on the upstream side of the orifice 20 and the velocity of flow of the fluid is at the maximum immediately after the passage of the orifice 20.

The first passage block 5 is connected to the second passage block 6 by screwing the bolt having been inserted through a bolt insertion hole 5*a* provided at the first passage block 5, to a female screw portion provided at the second passage block 6.

In the above-described shutoff-opening device 1, in the state where the first on-off valve 2 is open and the second on-off valve 3 is closed, when a process gas is introduced from the opening of the rear surface of the first on-off valve-corresponding communicating passage 18, the process gas flows through the first on-off valve-corresponding communicating passage 18, the first on-off valve-corresponding inflow passage 11, and the first on-off valve-corresponding outflow passage 12, and is sent to the processing furnace connected to the joint 7.

Figure 6:
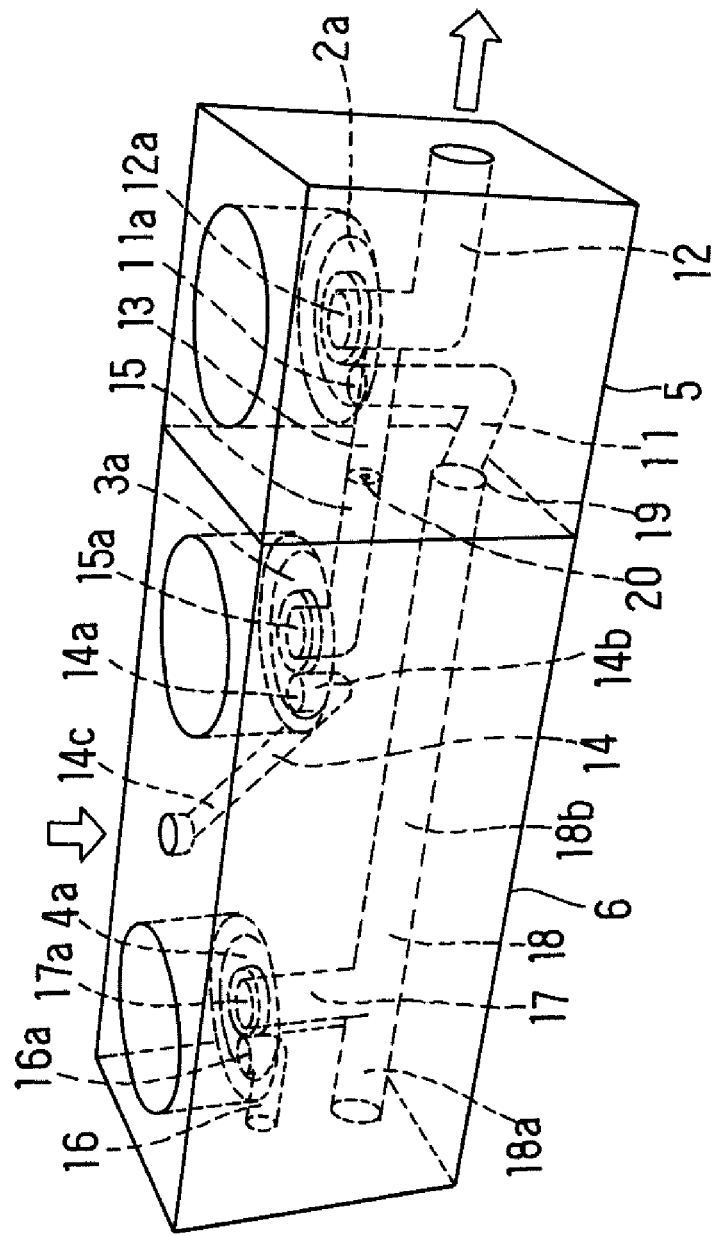
FIG. 6 is a perspective view of the major part of FIG. 1.

Thereafter, when a purge gas is introduced to the second on-off valve 3 in the state where the first on-off valve 2 is closed and the second on-off valve 3 is open, the purge gas, as shown by arrows shown in FIG. 6, flows through the second on-off valve-corresponding inflow passage 14, the second on-off valve-corresponding outflow passage 15, the communicating passage 13, and the first on-off valve-corresponding outflow passage 12, and is sent to the processing furnace connected to the joint 7. At this time, because the orifice (throttling portion) 20 is provided between the second on-off valve-corresponding outflow passage 15 and the communicating passage 13, the pressure of the fluid in the second on-off valve-corresponding outflow passage 15 located on the upstream side of the orifice 20 is higher than the pressure of the fluid in the communicating passage 13 located on the downstream side of the orifice 20.

When the pressure is high on the processing furnace side in the state where the first on-off valve 2 is closed and the second on-off valve 3 is open, there is a risk that the gas in the processing furnace flows backward from the first on-off valve-corresponding outflow passage 12 into the shutoff-opening device 1, the direction of which flow is opposite to the flow of the purge gas.

To address the issue of the backward flowing, in the above-described shutoff-opening device 1, the first on-off valve 2 is closed, whereby the gas in the processing furnace does not enter the valve chamber of the first on-off valve 2 from the first on-off valve-corresponding outflow passage 12. In addition, at a portion where the orifice 20 is provided, the pressure on the primary side (second on-off valve-corresponding outflow passage 15) is higher than the pressure on the secondary side (communicating passage 13). Because of this configuration, even if the pressure of the gas in the processing furnace is high to some degree, the backward flowing from the communicating passage 13 to the second on-off valve-corresponding outflow passage 15 is prevented, and the gas in the processing furnace does not enter the valve chamber of the second on-off valve 3. Therefore, back diffusion due to the backward flowing from the processing furnace side is prevented, corrosion of the diaphragm due to the gas flowing backward is prevented, and the frequency of replacement of the on-off valve is reduced, in both of the first on-off valve 2 and the second on-off valve 3.

In the above-described embodiment, although the orifice gasket constituting the orifice (throttling portion) 20 is a gasket constituting the seal portion 19, in which only the diameter of the through hole is changed, the orifice 20 may be formed separately from the gasket constituting the seal portion 19 and may be used together with the gasket. In addition, the orifice 20 is not limited to one of the gasket type. The throttling portion may be a nozzle, instead of the orifice 20.

In the above-described shutoff-opening device 1, because the first on-off valve 2 and the second on-off valve 3 are provided, the fluid may be switched appropriately between a first fluid (for example, a process gas) and a second fluid (for example, a purge gas) to be supplied to the external device; and because the third on-off valve 4 is provided, a vacuum vent line may be formed. Depending on the application purpose of the shutoff-opening device 1, there are some cases where the vacuum vent line is not required. In such a case, the third on-off valve 4, the third on-off valve-corresponding inflow passage 16, and the third on-off valve-corresponding outflow passage 17 may be omitted.

Although the inlet ports 14a and 16a and the outlet ports 12a, 15a, and 17a are provided so as to be arranged in one row (in the front-rear direction) in the direction parallel to a center line of the shutoff-opening device 1, these ports 14a, 16a, 12a, 15a, and 17a, of course, may be arranged so as to be shifted from the center line. In addition, the inlet port 11a may be disposed on the center line.

INDUSTRIAL APPLICABILITY

In accordance with the present invention, the shutoff-opening device that is installed in the close vicinity of the processing furnace of the semiconductor processing apparatus and that shuts off or opens the fluid passage, for example, is capable of preventing the internal contamination due to the fluid flowing backward, and is capable of reducing the frequency of replacement of the valve, thereby being capable of improving the performance of the semiconductor processing apparatus, and the like.

The invention claimed is:

1. A shutoff-opening device in a gas supply section of semiconductor manufacturing equipment, comprising:
   a first on-off valve, which supplies a process gas, disposed on a front end of the shutoff-opening device;
   a second on-off valve, which supplies a purge gas, adjacent to a rear side of the first on-off valve; and
   a passage block supporting the first on-off valve and the second on-off valve on a top surface of the passage block, wherein
   each of the first on-off valve and the second on-off valve is a two-port valve, and
   the passage block is provided with:
      a first on-off valve-corresponding inflow passage which is directly open to an exterior of the passage block via a first on-off valve-corresponding communicating passage, through which the process gas flows,
      a first on-off valve-corresponding outflow passage which is directly open to the exterior of the passage block,
      a second on-off valve-corresponding inflow passage which is directly open to the exterior of the passage block, and
      a second on-off valve-corresponding outflow passage directly connected to a communicating passage,
      the second on-off valve-corresponding outflow passage is in communication with the first on-off valve-corresponding outflow passage directly via a the communicating passage formed in the passage block without passing through an inside of the first on-off valve, and
      an orifice gasket having a through hole diameter which is smaller than a diameter of the second on-off valve-corresponding outflow passage and a diameter of the communicating passage, the orifice gasket forming a throttling portion connected between the second on-off valve-corresponding outflow passage and the communicating passage, to prevent backflow from the communicating passage to the second on-off valve-corresponding outflow passage.

2. The shutoff-opening device according to claim 1, further comprising:
- a third on-off valve disposed on a rear end of the shutoff-opening device and adjacent to a rear side of the second on-off valve and supported by the passage block, the third on-off valve controlling a vent line connected to the first on-off valve corresponding communication passage, wherein
- the third on-off valve is a two-port valve, and
- the passage block is provided with:
    - a third on-off valve-corresponding inflow passage, and
    - a third on-off valve-corresponding outflow passage, and
- the first on-off valve-corresponding communicating passage has one end that is directly open to an outer surface of the passage block, and the first on-off valve-corresponding communicating passage is in communication with the third on-off valve-corresponding outflow passage.

* * * * *